(12) United States Patent
Van Nieuwstadt et al.

(10) Patent No.: US 7,945,377 B1
(45) Date of Patent: May 17, 2011

(54) METHODS AND SYSTEMS FOR EXHAUST GAS MIXING

(75) Inventors: Michiel J. Van Nieuwstadt, Ann Arbor, MI (US); William Charles Ruona, Farmington Hills, MI (US); Paul Joseph Tennison, West Bloomfield, MI (US); Michael Hopka, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/765,081

(22) Filed: Apr. 22, 2010

(51) Int. Cl.
*G06F 17/00* (2006.01)
*F02M 25/07* (2006.01)
*G06F 19/00* (2006.01)

(52) U.S. Cl. .................. 701/108; 60/605.2; 123/568.23

(58) Field of Classification Search .................. 701/108, 701/109, 110, 114; 123/568.23, 568.21, 123/568.22; 60/605.2, 602, 605.1, 612
See application file for complete search history.

(56) References Cited

U.S. PATENT DOCUMENTS

| | | | | |
|---|---|---|---|---|
| 4,398,524 | A * | 8/1983 | Rachedi | 123/568.29 |
| 6,098,602 | A * | 8/2000 | Martin et al. | 701/108 |
| 7,437,874 | B2 * | 10/2008 | Ramamurthy et al. | 701/108 |
| 2007/0044472 | A1 * | 3/2007 | Zhang | 60/605.2 |
| 2008/0223038 | A1 | 9/2008 | Lutz et al. | |
| 2008/0314036 | A1 | 12/2008 | Yokoyama et al. | |
| 2009/0194079 | A1 | 8/2009 | Nagae et al. | |

FOREIGN PATENT DOCUMENTS

EP 1 433 934 B1 11/2006

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

A method of operating an engine system is described in which a back-pressure valve of a low pressure EGR system can be modulated at a lower frequency during an EGR operation, and at a higher frequency when additional exhaust gas sensing is requested. Back-pressure valve modulation can therefore be used to promote exhaust gas mixing while providing EGR. Exhaust gas constituents in the mixed exhaust gas can then be sensed with higher accuracy by downstream exhaust gas sensors.

20 Claims, 4 Drawing Sheets

METHODS AND SYSTEMS FOR EXHAUST GAS MIXING

FIELD

The present application relates to methods and systems for mixing exhaust gas constituents in an engine exhaust system.

BACKGROUND AND SUMMARY

In an effort to meet stringent federal government emissions standards, engine systems may be configured with exhaust gas recirculation (EGR) systems wherein at least a portion of the exhaust gas is recirculated to the engine intake. Additionally various sensors may be included in the engine exhaust manifold to estimate tailpipe emissions.

One example of such an EGR system is illustrated by Lutz et al. in US 2008/0223038 A1. Herein, a low pressure EGR (LP-EGR) system is configured to recirculate exhaust gas from downstream of a particulate filter to the engine intake. An amount of EGR is adjusted via an LP-EGR valve positioned in the LP-EGR bypass. Additional EGR adjustments may be performed via an exhaust gas back-pressure valve positioned downstream of the EGR bypass. Further, various sensors (for example, a NOx sensor, an air-fuel ratio sensor, and a particulate matter sensor) may be included in the engine exhaust manifold to estimate tailpipe emissions.

However, the inventors herein have recognized a potential issue with such systems. Exhaust gas constituents may not be uniformly distributed. Consequently, there may be a discrepancy between the concentration of an exhaust gas constituent as estimated by a sensor in the exhaust manifold, and the concentration of the constituent in the bulk exhaust gas. Thus, the accuracy of the sensor may be degraded leading to degraded engine emissions. While EGR valve adjustments may provide some exhaust gas mixing, even small EGR valve modulations may have large effects on an amount of EGR provided, thereby degrading the desired EGR control. Fixed exhaust mixers may alternatively be included in the engine exhaust to improve exhaust gas mixing, however, such mixers may add substantial component costs.

Thus, in one example, the above mentioned issue may be addressed by improving exhaust gas mixing through a method of operating an engine including an EGR system coupled between an engine intake and an engine exhaust. The method may comprise, adjusting a back-pressure valve of the EGR system to provide a desired EGR amount, the adjusting below a first frequency, and selectively modulating the back-pressure valve above the first frequency to promote exhaust gas mixing, while maintaining the desired EGR amount.

In one example, an engine may include an exhaust gas recirculation (EGR) loop coupling the engine exhaust manifold to the intake manifold. The low pressure EGR loop may recirculate at least some exhaust gas from downstream of an emission control device in the exhaust manifold, to upstream of an intake throttle in the intake manifold. An amount of exhaust gas recirculated to the intake may be adjusted by ways of an EGR valve included in the EGR loop. An additional back-pressure valve, positioned in the exhaust manifold, downstream of the EGR loop and the emission control device, and upstream of exhaust emission sensors, may be configured to provide additional back-pressure to drive exhaust gas flow into the EGR loop. During selected engine operating conditions, EGR may be provided by adjusting the EGR valve and the back-pressure valve. For example, an amount of EGR may be increased by opening the EGR valve, and partially closing the back-pressure valve. The back-pressure valve may be adjusted at a lower frequency (or below a predefined frequency) to provide the desired amount of EGR. Herein, by recirculating heated exhaust gas to the engine intake, engine exhaust emissions and fuel economy may be improved.

In one example, the emission control device may include a diesel particulate filter (DPF). Herein, to improve filter operations, and consequently exhaust emissions, exhaust NOx and/or particulate matter (PM) levels may be periodically sensed by one or more exhaust sensors positioned downstream of the DPF and the back-pressure valve. During selected conditions when sensing is requested, (for example, when sensing is requested to determine whether the filter needs to be regenerated, or when sensing is requested for filter leak detection routines), the back-pressure valve may be modulated (for example, sinusoidally pulsed) to create a local turbulence that mixes the exhaust gas. Specifically, the back-pressure valve may be selectively modulated at a higher frequency (or above the predefined frequency) such that exhaust gas mixing is achieved without affecting the average EGR flow. For example, the back-pressure valve may be adjusted with a first frequency during a first EGR condition when no sensing is requested. Then, during a second EGR condition, when sensing is requested, in addition to the adjustment, the back-pressure valve may be modulated with a second, higher frequency component.

The modulation frequency, during sensing, may be determined based on engine operating conditions, and may be selected so as to maintain the requested amount of EGR. For example, the frequency may be selected such that the average back-pressure valve position is maintained at the position desired for the requested amount of EGR. In one example, determining the modulation frequency based on engine operating conditions may include increasing the frequency of modulation as an engine speed increases. Additionally, the amplitude of modulation may be adjusted based on engine operating conditions. For example, the adjustment may include decreasing the amplitude of the modulation as engine valve timing approaches valve opening or valve closing limits.

In still another embodiment, the EGR valve may be selectively modulated in addition to the back-pressure valve modulation during sensing. The EGR valve may be an HP-EGR valve and/or an LP-EGR valve. Herein, the EGR valve modulation may be adjusted in coordination with the back-pressure valve modulation such that the requested amount of EGR is maintained. For example, the frequency (and amplitude) of EGR valve modulation may be adjusted to match the frequency of the back-pressure valve modulation, while a phase of the EGR valve modulation may be adjusted to off-set the back-pressure valve modulation.

In this way, by applying a periodic motion to the back-pressure valve, a local stirring of exhaust gases may be achieved that may improve exhaust gas mixing without affecting EGR flow. By improving the mixing of exhaust gases, the sensing accuracy of exhaust gas sensors may be improved. Additionally, by using components already in use in EGR systems to actively mix the exhaust gas, the need for dedicated mixers, such as fixed exhaust gas mixers, may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
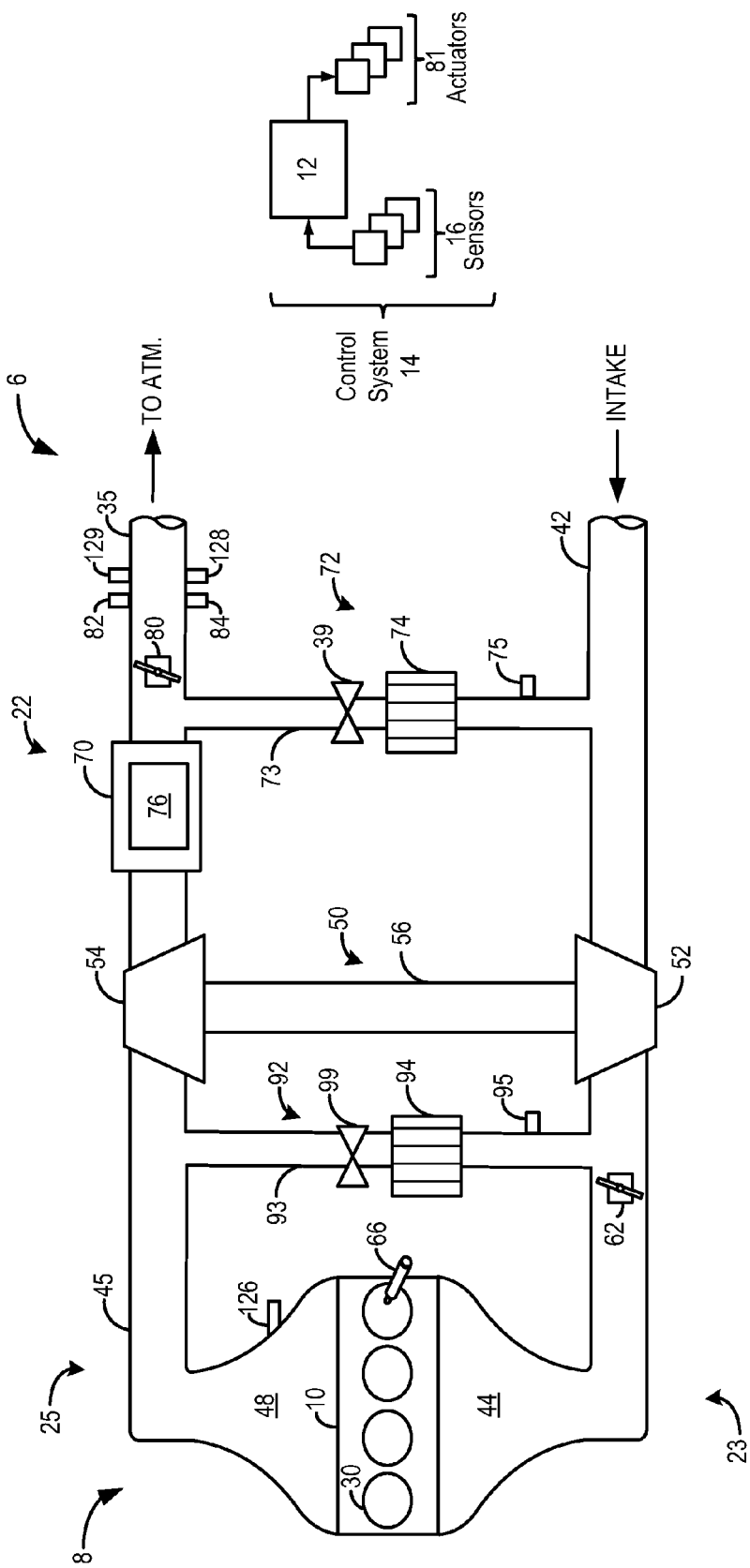
FIG. 1 shows a schematic depiction of an engine and an associated exhaust gas recirculation system.

The following description relates to systems and methods for improving exhaust gas mixing in an engine exhaust. As shown in FIG. 1, an engine configured with a low-pressure and a high-pressure exhaust gas recirculation (EGR) system may include an EGR valve in each EGR loop for adjusting an amount of exhaust gas recirculated to the engine intake. A back-pressure valve positioned downstream of the LP-EGR loop may be adjusted to further assist in diverting exhaust gas through the EGR loops. As illustrated in FIG. 4, during conditions when exhaust gas sensing is requested, for example to determine filter regeneration or filter leak detection, the back-pressure valve may be additionally modulated at a higher frequency to promote exhaust gas mixing while maintaining the EGR operation. In response to the request for sensing, an engine controller may be configured to perform a control routine, such as the routines of FIGS. 2-3, to select the higher frequency of the back-pressure valve modulation based on engine operating conditions. The controller may also adjust the amplitude of the back-pressure valve modulation based on the operating conditions. One or more of the LP-EGR valve and the HP-EGR valve may also be modulated by the controller, based on the back-pressure valve modulation, to maintain the desired EGR rate. In this way, exhaust gas mixing may be achieved without affecting the EGR flow. The mixed exhaust gas may then be sensed accurately by exhaust gas sensors positioned downstream of the back-pressure valve. By improving exhaust gas mixing without affecting EGR, exhaust emissions may be accurately sensed and engine emission control may be improved.

FIG. 1 shows a schematic depiction of a vehicle system 6. The vehicle system 6 includes an engine system 8, including engine 10, coupled to emission control system 22. Engine 10 includes a plurality of cylinders 30. Engine 10 also includes an intake 23 and an exhaust 25. Intake 23 includes a throttle 62 fluidly coupled to the engine intake manifold 44 via intake passage 42. Exhaust 25 includes an exhaust manifold 48 leading to an exhaust passage 45 that routes exhaust gas to the atmosphere via tailpipe 35.

Engine 10 may further include a boosting device, such as turbocharger 50. Turbocharger 50 may include a compressor 52 arranged along intake passage 42. The compressor 52 may be at least partially driven by turbine 54, arranged along exhaust passage 45, via shaft 56. The amount of boost provided by the turbocharger may be varied by an engine controller. An optional charge after-cooler (not shown) may be included downstream of compressor 52 in the intake passage to reduce the temperature of the intake air compressed by the turbocharger+.

Emission control system 22, coupled to exhaust passage 45, may include one or more emission control devices 70 mounted in a close-coupled position in the exhaust. One or more emission control devices may include particulate filter 76, SCR catalyst, three-way catalyst, lean NOx trap, oxidation catalyst, etc. The emission control devices may be positioned upstream and/or downstream (as depicted) of turbine 54 in exhaust passage 45. In an alternate embodiment, particulate filter 76 may be positioned upstream of the turbocharger turbine 54 while a NOx trap or SCR catalyst is positioned downstream of the turbine. The particulate filter 76 may be, for example, an uncoated diesel particulate filter. Alternatively, the particulate filter 76 may include a catalytic washcoat. Catalytic washcoats used may include, for example, palladium, a hydrocarbon adsorbent (such as activated carbon or zeolite), an SCR catalyst, a HC adsorbent-SCR catalyst combination, etc.

Engine 10 may further include one or more exhaust gas recirculation (EGR) passages for recirculating at least a portion of exhaust gas from exhaust passage 45 to intake passage 42. For example, the engine may include a low-pressure EGR (LP-EGR) system 72 configured to divert a portion of exhaust gas from downstream of turbine 54 and emission control device 70 to the engine intake upstream of compressor 52 and throttle 62 via LP-EGR loop 73. LP-EGR system 72 may be operated during conditions such as in the presence of turbocharger boost and/or when exhaust gas temperature is above a threshold. LP-EGR loop 73 may further include an LP-EGR cooler 74 to lower the temperature of exhaust gas being recirculated into the engine intake. The engine may also include a high-pressure EGR (HP-EGR) system 92 configured to divert a portion of exhaust gas from upstream of turbine 54 to the engine intake downstream of compressor 52 and upstream of throttle 62 via HP-EGR loop 93. HP-EGR system 92 may be operated during conditions such as in the absence of turbocharger boost. HP-EGR loop 93 may further include an HP-EGR cooler 94 to lower the temperature of exhaust gas being recirculated into the engine intake.

An amount and/or rate of exhaust gas recirculation through LP-EGR loop 73 may be varied by controller 12 via LP-EGR valve 39. One or more exhaust gas sensors, such as EGR sensor 75, may be positioned within LP-EGR loop 73 to provide an indication of one or more of a pressure, temperature, and air-fuel ratio of exhaust gas recirculated through LP-EGR system 72. Similarly, an amount and/or rate of exhaust gas recirculation through HP-EGR loop 93 may be varied by controller 12 via HP-EGR valve 99. One or more exhaust gas sensors, such as EGR sensor 95, may be positioned within HP-EGR loop 93 to provide an indication of one or more of a pressure, temperature, and air-fuel ratio of exhaust gas recirculated through HP-EGR system 92.

An exhaust back-pressure valve 80 (herein also referred to as an exhaust throttle) may be included downstream of LP-EGR loop 73 to create sufficient back-pressure to drive exhaust gas through the LP-EGR loop. During conditions when EGR is requested, LP-EGR valve 39 and back-pressure valve 80 may be adjusted to divert an amount of exhaust gas through the EGR loop to provide the desired amount of EGR. An engine controller may adjust back-pressure valve 80 below a first frequency to provide the EGR. Alternatively, HP-EGR valve 99 may be adjusted to divert an amount of exhaust gas through the EGR loop to provide the desired amount of EGR. By recirculating heated exhaust gas to the engine intake, improved emission and fuel economy benefits may be achieved.

Engine 10 may be controlled at least partially by a control system 14 including controller 12 and by input from a vehicle operator via an input device (not shown). Control system 14 is shown receiving information from a plurality of sensors 16 (various examples of which are described herein) and sending control signals to a plurality of actuators 81. As one example, sensors 16 may include exhaust gas sensor 126 located upstream of the emission control device, exhaust temperature sensor 128 and exhaust pressure sensor 129 located downstream of the emission control system in tailpipe 35, and EGR sensors 75, 95 located in LP-EGR loop 73 and HP-EGR loop 93. Various exhaust gas sensors may also be included in exhaust passage 45 downstream of exhaust back-pressure valve 80, such as a particulate matter (PM) sensor 82, NOx sensor 84, oxygen sensor (not shown), ammonia sensor (not shown), hydrocarbon sensor (not shown), etc. Other sensors such as additional pressure, temperature, air/fuel ratio and composition sensors may be coupled to various locations in the vehicle system 6. As another example, actuators 81 may include fuel injector 66, EGR valve 39, throttle 62, and back-pressure valve 80. Other actuators, such as a variety of additional valves and throttles, may be coupled to various locations in vehicle system 6. Controller 12 may receive input data from the various sensors, process the input data, and trigger the actuators in response to the processed input data based on instruction or code programmed therein corresponding to one or more routines. An example control routine is described herein with regard to FIG. 2.

During select EGR conditions, additional exhaust gas sensing may be requested. For example, exhaust gas sensing may be requested during leak detection routines, or to determine if particulate filter 76 needs regeneration. As such, insufficient exhaust gas mixing in the tailpipe may lead to inaccurate exhaust gas sensing by the exhaust gas sensors. Consequently, emission control may be degraded. In one example, when the engine is operating at low engine speed but with a high load, there may be insufficient exhaust gas mixing. Thus, as further elaborated in FIGS. 2-3, in response to a request for sensing, an engine controller may selectively modulate back-pressure valve 80 in addition to the adjusting of the back-pressure valve to provide the requested EGR. For example, the engine controller may modulate back-pressure valve 80 above the first frequency to promote exhaust gas mixing while maintaining the EGR flow. Herein, the contraction and expansion of exhaust flow across the valve causes a local turbulence that improves exhaust gas mixing. The modulation frequency and/or amplitude may be selected based on engine operating conditions. By adjusting a back-pressure valve to provide EGR and by further modulating the back-pressure valve in response to a request for sensing, exhaust gas mixing may be achieved while maintaining EGR flow characteristics. Additionally, by using EGR components to actively mix the exhaust gas, the need for dedicated exhaust gas mixers may be reduced, and component reduction benefits may be achieved.

In another example, the back-pressure valve may be modulated to create turbulence for mixing the exhaust gas to facilitate downstream exhaust gas sensing, while the HP-EGR valve and/or LP-EGR valve is correspondingly modulated to maintain the EGR flow rate. As elaborated with reference to FIGS. 2-4, by modulating the EGR valve (LP-EGR valve or HP-EGR valve) based on the modulation of the back-pressure valve, EGR flow may be maintained while enabling sufficient exhaust gas mixing.

Figure 2:
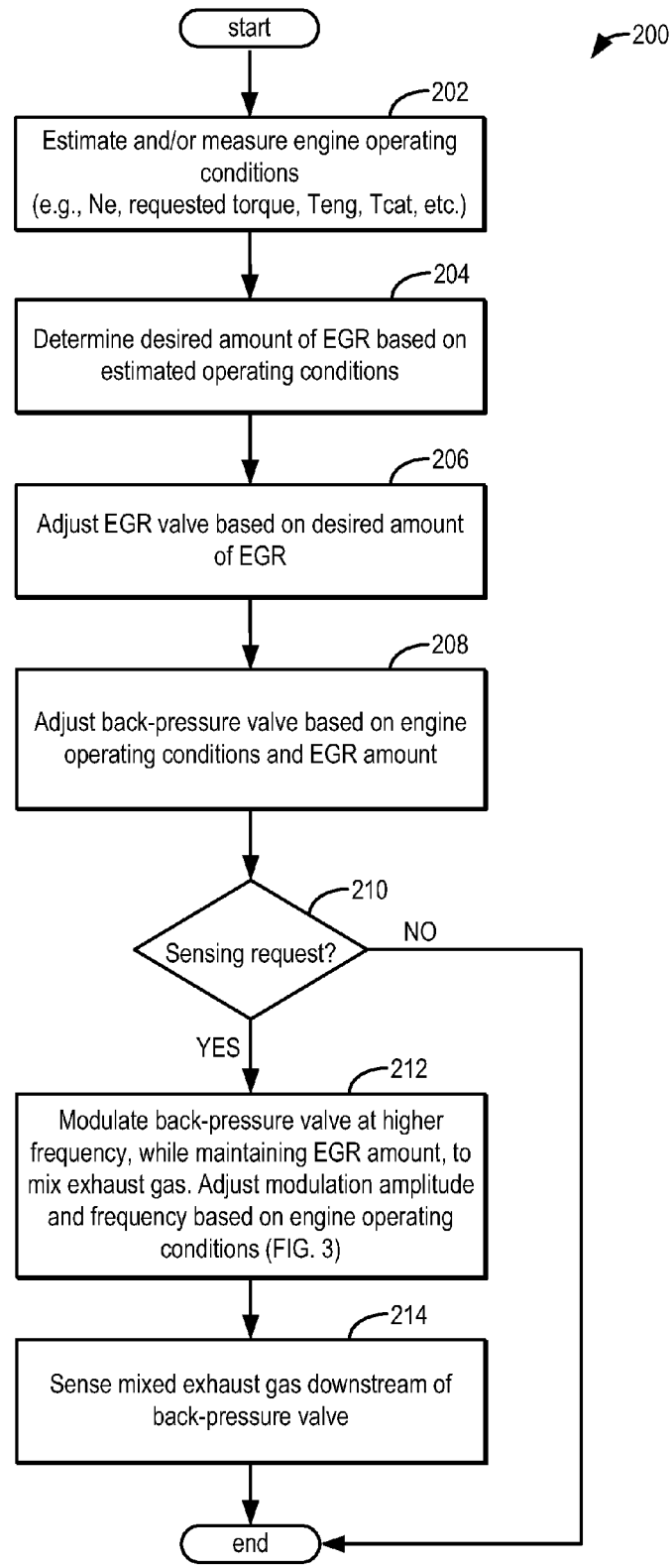
FIGS. 2-3 show high level flow charts illustrating routines that may be implemented for improving exhaust gas mixing.

Now turning to FIG. 2, an example routine 200 is depicted for adjusting a back-pressure valve coupled to an EGR system to provide a desired amount of EGR and to promote exhaust gas mixing in response to a request for exhaust gas sensing.

At 202, engine operating conditions may be estimated and/or measured. These may include, for example, engine speed, driver-requested torque, engine temperature, catalyst temperature, etc. At 204, a desired amount of EGR may be determined based on the estimated operating conditions. At 206, the EGR valve may be adjusted based on the requested amount of EGR. For example, the EGR valve may be opened to increase the amount of EGR provided to the engine intake. At 208, the exhaust back-pressure valve may also be adjusted based on the engine operating conditions to provide the requested amount of EGR. For example, when the EGR valve is opened, the back-pressure valve may be partially closed to provide the back-pressure required to divert exhaust gas into the EGR loop. The back-pressure valve adjustment may be performed below a first frequency. At 210, it may be determined if a request for sensing has been received. In one example, a request for exhaust gas sensing may be received during a leak detection routine. In another example, a request for exhaust gas sensing may be received after a threshold duration of engine operation has elapsed to determine if filter regeneration is required.

If no request for sensing is received at 210, the routine may end. However, if a request for sensing is received, then at 212, the engine controller may additionally modulate the back-pressure valve (on top of the adjustment to provide the desired EGR flow, for example), by modulating the back-pressure valve at a frequency above the first frequency to promote exhaust gas mixing while maintaining the average EGR flow (averaged over the modulation period) at the desired EGR amount. The modulation frequency may be adjusted based on the estimated engine operating conditions, including engine speed. The adjustment may include, for example, increasing the modulation frequency as engine speed increases. As such, the frequency of the modulation may be kept within the bandwidth of the back-pressure valve. Additionally, an amplitude of the modulation may be adjusted based on the engine operating conditions. For example, the amplitude may be decreased as the valve opening of the back-pressure valve approaches valve fully opened (e.g., an open stop) or fully closed (e.g., a close stop).

While one example includes sinusoidal modulation of the back-pressure valve on top of the adjustments providing the average desired EGR flow, various other modulation schemes may be used. For example, modulation including a plurality of sinusoidal components, each one at a frequency above the first frequency, may be used, where the various frequencies of the sinusoidal components may be selected based on operating conditions such as exhaust gas flow rate, engine speed, exhaust pressure, exhaust temperature, etc.

Figure 3:
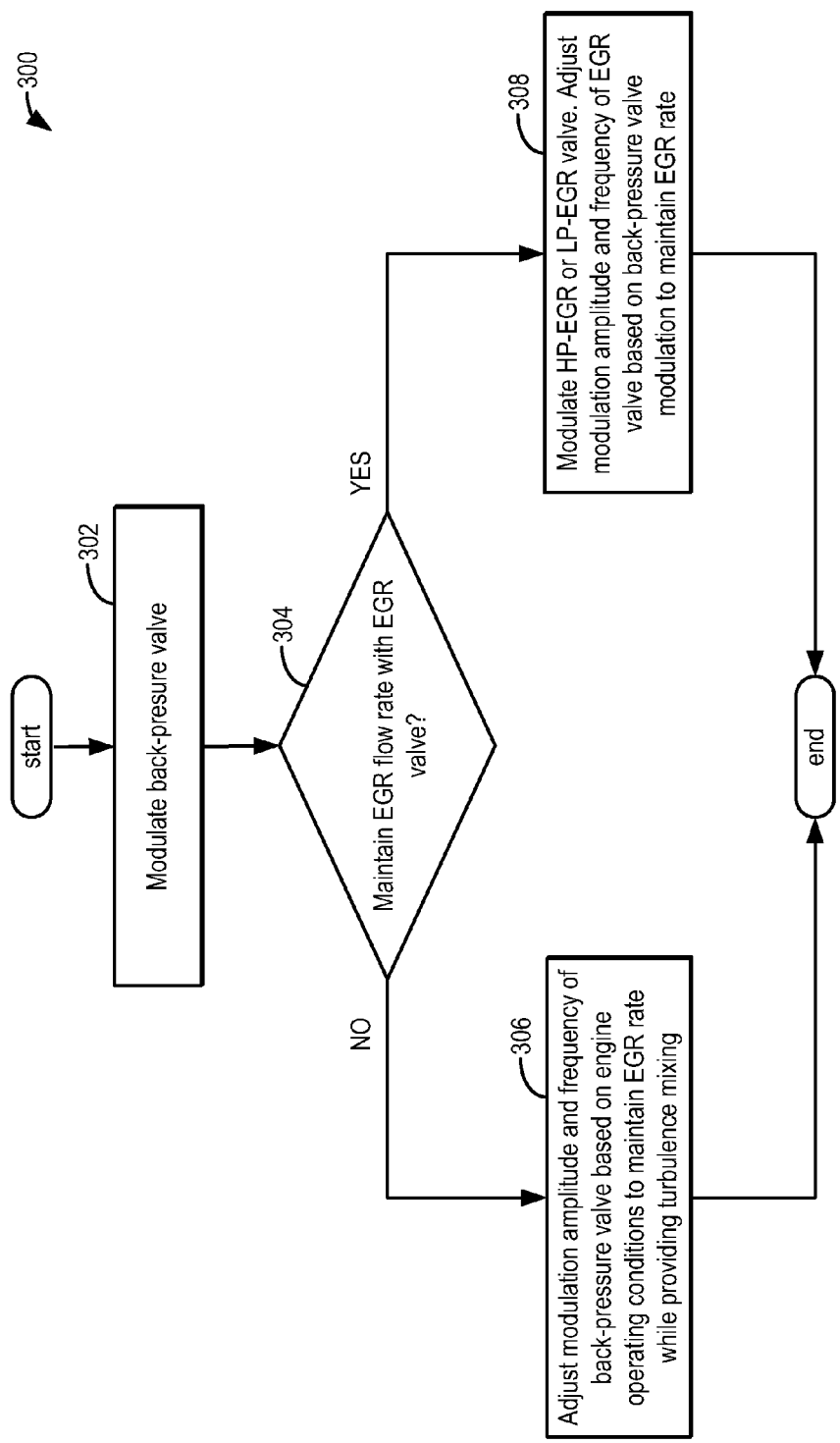
Figure 4:
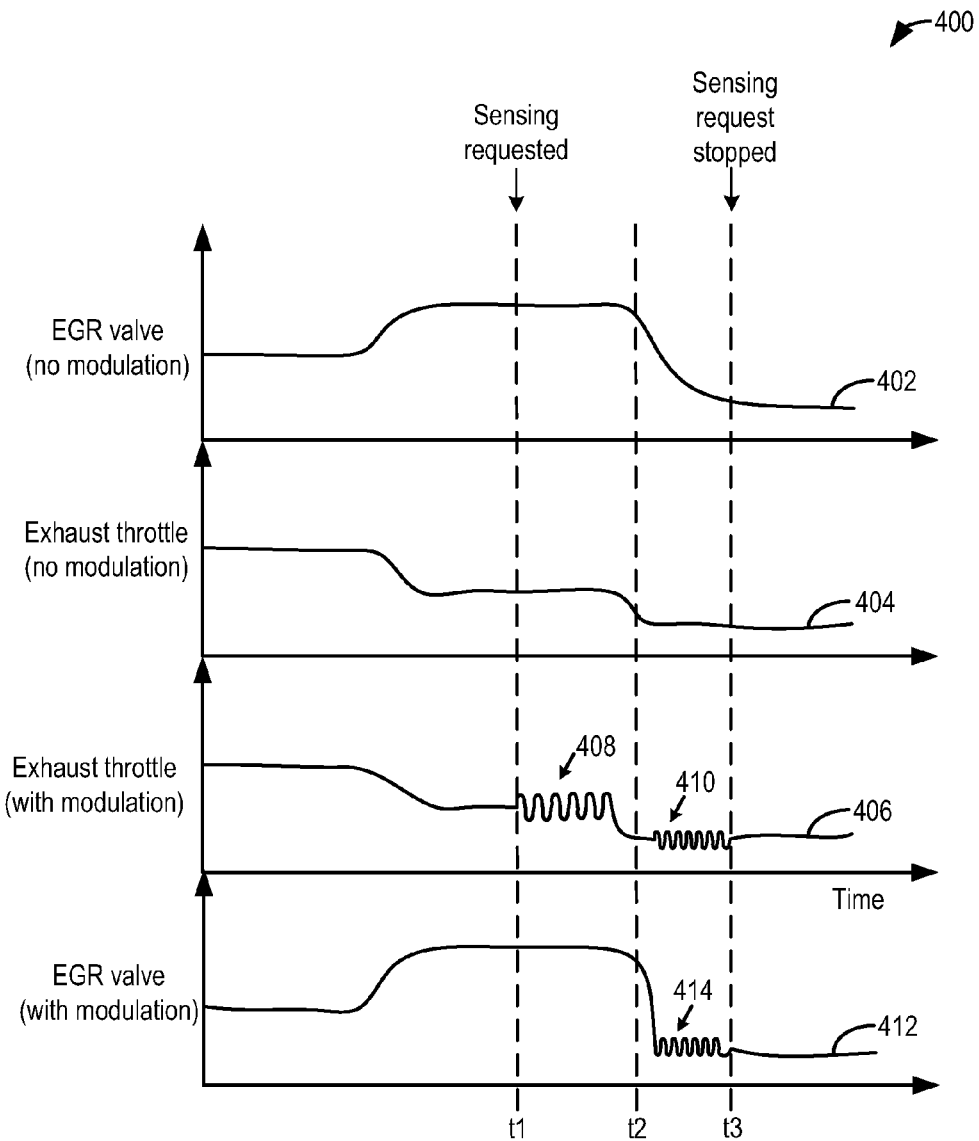
FIG. 4 shows example exhaust gas mixing operations according to the present disclosure.

As further elaborated with reference to FIG. 3, the engine controller may optionally maintain the amount of EGR by also adding modulation to the HP-EGR valve and/or LP-EGR valve, wherein the EGR valve modulation may be based on the modulation of the back-pressure valve. This may include, adjusting a frequency and amplitude of the EGR valve modulation to match the frequency of the back-pressure valve modulation, while adjusting a phase of the EGR valve modulation relative to the modulation of the back-pressure valve to offset the effect of the back-pressure valve modulation on instantaneous EGR flow into the engine. For example, the EGR valve modulation may be at a common frequency, but out of phase with, the back-pressure valve modulation to effectively cancel out the modulation's effect on the instantaneous EGR flow.

By modulating the back-pressure valve, a local stiffing of exhaust gases may be achieved which may promote exhaust gas mixing, when requested. At 214, the mixed exhaust gases may be sensed by the exhaust gas sensors downstream of the back-pressure valve. By mixing the exhaust gases before and upstream of the sensors, the sensing accuracy of the sensors may be improved, thereby improving emission control. Additionally, by selectively applying the modulation, it is possible to conserve energy when sufficient exhaust mixing occurs without modulation. For example, FIG. 2 shows providing valve modulation during sensing of one or more of sensors 82 or 84, where modulation is not carried out when there is no sensing. However, in another example, the sensors may be monitored during engine operation (and used as a basis for adjusting engine operation, filter regeneration, and the like) during both modulation of the valve, and during adjustment of the valve without the added modulation. For example, conditions at higher engine speeds and higher loads may generate sufficient exhaust gas mixing, such that no modulation is needed, and thus no modulation may be provided under these selected conditions. Further still, whether or not the modulation is added to the back-pressure valve may be based on a position of the back-pressure valve, in that more open positions generate less turbulence, whereas more closed positions generate more turbulence. As such, in one example, during a first condition (such as a first back-pressure valve position being less than a threshold), an operating condition (e.g., initiation of filter regeneration) may be based on sensor readings of a sensor downstream of the back-pressure valve (such as from sensor 82) without additional sinusoidal modulation of the back-pressure valve; and, during a second condition (such as a second back-pressure valve position being greater than a threshold), the operating condition may be based on sensor readings of the downstream sensor with additional sinusoidal modulation of the back-pressure valve to increase turbulence and thus accuracy of the sensor reading.

Turning now to FIG. 3, an example routine 300 is described for maintaining an EGR flow during the back-pressure valve modulation. At 302, the back-pressure valve may be modulated above a first frequency to provide exhaust gas mixing. At 304, it may be determined whether it is desired to maintain an EGR flow rate with an EGR valve. Herein, the EGR valve may be an LP-EGR valve of the LP-EGR system and/or an HP-EGR valve of the HP-EGR system. If it is not desired to maintain the EGR flow rate with an EGR valve, then at 306, the modulation amplitude and frequency of back-pressure valve modulation may be adjusted based on the engine operating conditions so as to maintain the EGR flow rate while providing the requested turbulence mixing. In one example, EGR valve modulation may not be requested due to the EGR valve motion being limited or restricted. For example, the position of the EGR valve may be too close to a fully open or fully closed position such that modulation may not be possible.

In comparison, if it is desired to maintain the EGR flow rate with an EGR valve, for example, when the EGR valve's motion is not limited or restricted, then at 308, one or more of the HP-EGR valve and the LP-EGR valve may be modulated in addition to the back-pressure valve. A modulation amplitude and frequency of the EGR valve's modulation may be adjusted based on the modulation (amplitude and frequency) of the back-pressure valve modulation, such that a desired EGR flow rate is maintained. In one example, such as during conditions of no LP-EGR, the HP-EGR valve may be modulated in addition to the back-pressure valve to maintain the EGR rate. In another example, such as during conditions of no HP-EGR, the LP-EGR valve may be modulated in addition to the back-pressure valve to maintain the EGR rate. In another example, an EGR valve may be selected based on response times. For example, the HP-EGR valve may be selected if the HP-EGR valve moves faster (i.e. with a higher frequency) in response to a request for modulation. In another example, an EGR valve may be selected based on the degree of response. For example, the LP-EGR valve may be selected if a smaller amount of modulation is required for the LP-EGR valve (i.e. a smaller change in the LP-EGR valve's position) as compared to a larger amount of modulation required for the HP-EGR valve (i.e. a larger change in the HP-EGR valve's position) to maintain the desired EGR rate. In still another example, the controller may select between the EGR valves based on which valve is closer to a valve limit. For example, the controller may select the LP-EGR valve for EGR valve modulation when the HP-EGR valve is closer to a maximum or minimum limit (such as closer to a fully open or a fully closed position), or select the HP-EGR valve for EGR valve modulation when the LP-EGR valve is closer to a maximum or minimum limit (such as closer to a fully open or a fully closed position). In still other examples, EGR valve modulation may include modulating both the HP-EGR valve and the LP-EGR valve to maintain the EGR rate while modulating the back-pressure valve to provide exhaust gas mixing. As such, EGR valve modulation may include adjusting a modulation frequency and amplitude of the selected EGR valve(s) to match the frequency of the back-pressure valve modulation, such that the effect of the back-pressure valve modulation on instantaneous EGR flow into the engine is offset. For example, as illustrated with reference to FIG. 4, the EGR valve modulation may be at a common frequency, but out of phase with the back-pressure valve modulation to effectively cancel out the back-pressure valve modulation's effect on the instantaneous EGR flow.

Now turning to FIG. 4, example EGR and back-pressure valve operations are illustrated on map 400 to further clarify the present disclosure. Map 400 depicts EGR valve adjustments without additional modulation at 402, and with modulation at 412, and depicts back-pressure valve (herein also referred to as an exhaust throttle) adjustments without additional back-pressure valve modulation at 404, and with modulation at 406.

Based on engine operating conditions, a desired amount of EGR may be determined by a controller. During a first EGR condition, when no sensing has been requested, the engine controller may adjust an EGR valve (graph 402) and the back-pressure valve (graph 404) to provide the requested amount of EGR. Herein, the EGR valve may be the HP-EGR valve of the HP-EGR system and/or the LP-EGR valve of the LP-EGR system. In one example, as depicted before $t_1$, the requested amount of EGR may be provided by opening (or increasing an opening of) the EGR valve, and partially closing (or decreasing an opening of) the exhaust back-pressure valve. Herein, during the first EGR condition, the adjusting of the valves is performed without modulation.

In comparison, during a second EGR condition, in response to a request for sensing received at $t_1$, the controller may adjust the EGR valve and the back-pressure valve to provide the requested amount of EGR, and in addition to the adjustment, the controller may modulate only the back-pressure valve at a higher frequency (graph 406) than the adjusting to promote exhaust gas mixing in the engine exhaust manifold. Following the modulation, one or more emission sensors may sense the mixed exhaust gas downstream of the back-pressure valve.

Further, during the second EGR condition, when modulating the back-pressure valve, the controller may determine a modulation frequency and amplitude based on engine operating conditions. For example as shown at 408, during a first modulation between $t_1$ and $t_2$, the frequency of the back-pressure valve modulation may be decreased in response to a decrease in engine speed and an amplitude of the back-pressure valve modulation may be increased in response to a valve timing moving away from valve opening or closing. In another example, as shown at 410, during a second modulation between $t_2$ and $t_3$, the frequency of the modulation may be increased in response to an increase in engine speed and an amplitude of the modulation may be decreased in response to a valve timing moving towards the limit for valve opening or closing. As such, it will be appreciated that the modulation frequency of the back-pressure valve may always be maintained within the bandwidth of the back-pressure valve. Following sensing, after $t_3$, when no more sensing is requested, the back-pressure valve modulation may be stopped and the EGR valve adjustment and back-pressure valve adjustments may be maintained.

During a third EGR condition, while the back-pressure valve is modulated to generate a local turbulence for exhaust gas mixing, the EGR valve may be modulated to maintain the EGR flow rate. Specifically, the EGR valve may be modulated in coordination with the back-pressure valve modulation to enable exhaust gas mixing while maintaining the desired EGR flow. As discussed earlier, the engine controller may select one or more of the LP-EGR valve and the HP-EGR valve for the EGR valve modulation. For example, as shown at 414, between $t_2$ and $t_3$, the EGR valve may be modulated at the same frequency and amplitude as the corresponding back-pressure valve modulation, but with a phasing that may offset the back-pressure valve modulation.

In this way, an EGR system back-pressure valve may be modulated (e.g., in addition to adjustments in response to providing the desired EGR amount) during EGR conditions to provide a local turbulence that may promote exhaust gas mixing without affecting the average EGR flow. By sensing mixed exhaust gas with sensors positioned downstream of the modulated valve, the accuracy of exhaust gas sensing may be improved, enabling more precise emission and EGR control. Further, by using EGR components already present in the engine system for actively mixing the exhaust gas, the need for dedicated exhaust gas mixers may be reduced, thereby providing component reduction benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

The invention claimed is:

1. An engine system, comprising:
    an engine intake;
    an engine exhaust;
    an emission control device;
    a low pressure EGR loop coupling the engine exhaust to the engine intake;
    an EGR valve positioned in the EGR loop and configured to adjust an amount of exhaust gas diverted through the EGR loop;
    a back-pressure valve positioned downstream of the EGR loop;
    one or more exhaust gas sensors positioned downstream of the back-pressure valve; and
    a control system with computer-readable instructions for,
        adjusting the EGR valve and the back-pressure valve to divert an amount of exhaust gas through the EGR loop; and
        in response to a request for exhaust gas sensing, modulating the back-pressure valve at a frequency higher than the adjustment to promote exhaust gas mixing while maintaining the amount of exhaust gas diversion, and sense the mixed exhaust gas downstream of the back-pressure valve.

2. The system of claim 1, wherein the frequency of the modulation is adjusted based on engine operating conditions including engine speed.

3. A method of operating an engine including an EGR system coupled between an engine intake and an engine exhaust, comprising,
    adjusting a back-pressure valve of the EGR system to provide a desired EGR amount, the adjusting below a first frequency; and
    selectively modulating the back-pressure valve above the first frequency to promote exhaust gas mixing, while maintaining the desired EGR amount.

4. The method of claim 3, further comprising, sensing the mixed exhaust gas downstream of the back-pressure valve, wherein the modulation above the first frequency is in response to a sensing request, and further wherein the modulation is in addition to the adjusting.

5. The method of claim 3, wherein the frequency of modulation is determined based on engine operating conditions including an engine speed.

6. The method of claim 5, wherein determining the frequency of modulation includes increasing the frequency as engine speed increases.

7. The method of claim 5, wherein during sensing, an amplitude of the modulation is adjusted based on engine operating conditions.

8. The method of claim 7, wherein adjusting an amplitude of the modulation includes, increasing an amplitude as engine valve timing approaches a valve opening or closing limit.

9. The method of claim 3, wherein the frequency of modulation is within a bandwidth of the back-pressure valve.

10. The method of claim 3, further comprising, adjusting an EGR valve of the EGR system to provide the amount of EGR.

11. The method of claim 10, wherein maintaining the amount of EGR includes, modulating the EGR valve, the EGR valve modulation adjusted based on back-pressure valve modulation.

12. The method of claim 11, wherein the adjustment includes, adjusting a frequency of the EGR valve modulation to match the frequency of the back-pressure valve modulation, and adjusting a phase of the EGR valve modulation to offset the back-pressure valve modulation, wherein the EGR valve is positioned in a high-pressure EGR system.

13. A method of operating an engine system including an engine intake, an emission control device, an engine exhaust coupled to the engine intake through an EGR loop, an EGR valve positioned in the EGR loop, and a back-pressure valve positioned downstream of the EGR loop, comprising,
    during a first EGR condition, adjusting the EGR valve and the back-pressure valve to provide a requested amount of EGR; and
    during a second EGR condition, adjusting the EGR valve and the back-pressure valve to provide a requested amount of EGR, modulating the back-pressure valve at a higher frequency than the adjusting to promote exhaust gas mixing in the engine exhaust, and sensing the mixed exhaust gas downstream of the back-pressure valve.

14. The method of claim 13, wherein the second EGR condition includes exhaust gas sensing by one or more sensors positioned downstream of the back-pressure valve, wherein during the first EGR condition, the adjusting is without modulation at the higher frequency.

15. The method of claim 14, wherein the one or more sensors include at least one of a PM sensor and a NOx sensor.

16. The method of claim 13, wherein the higher frequency is adjusted responsive to engine operating conditions including engine speed and engine load.

17. The method of claim 16, wherein the adjustment includes increasing the frequency as an engine speed increases.

18. The method of claim 13, wherein during the second EGR condition, an amplitude of the modulation is adjusted based on engine operating conditions including valve timing.

19. The method of claim 18, wherein the adjustment includes, decreasing the amplitude as the valve timing approaches valve opening or valve closing.

20. The method of claim 13, further comprising, during the second EGR condition, modulating the EGR valve at the higher frequency and adjusting a phase of the EGR valve modulation to maintain the requested amount of EGR.

* * * * *